(12) United States Patent
Maekawa et al.

(10) Patent No.: US 7,642,690 B2
(45) Date of Patent: Jan. 5, 2010

(54) AUTOMOTIVE TANDEM ALTERNATOR HAVING HIGH EFFICIENCY AND IMPROVED ARRANGEMENT OF REGULATOR

(75) Inventors: Takeo Maekawa, Okazaki (JP); Shin Kusase, Oobu (JP); Akiya Shichijoh, Yatomi (JP)

(73) Assignee: Denso Corporation, Kariya (JP)

( * ) Notice: Subject to any disclaimer, the term of this patent is extended or adjusted under 35 U.S.C. 154(b) by 342 days.

(21) Appl. No.: 11/783,727

(22) Filed: Apr. 11, 2007

(65) Prior Publication Data

US 2007/0247016 A1 Oct. 25, 2007

(30) Foreign Application Priority Data

Apr. 21, 2006 (JP) ............................. 2006-118099

(51) Int. Cl.
*H02K 19/36* (2006.01)
*H02K 16/00* (2006.01)
*H02P 9/30* (2006.01)

(52) U.S. Cl. .................. 310/263; 310/68 R; 310/68 D; 310/112

(58) Field of Classification Search ................. 310/112, 310/114, 67 R, 68 R, 68 D, 263
See application file for complete search history.

(56) References Cited

U.S. PATENT DOCUMENTS

| | | | |
|---|---|---|---|
| 3,793,544 A * | 2/1974 | Baumgartner et al. ........ | 320/123 |
| 4,788,486 A * | 11/1988 | Mashino et al. .............. | 320/123 |
| 5,177,388 A * | 1/1993 | Hotta et al. ................... | 310/114 |
| 5,274,322 A * | 12/1993 | Hayashi et al. ............... | 322/90 |
| 5,444,355 A * | 8/1995 | Kaneyuki et al. ............. | 322/58 |
| 5,581,172 A * | 12/1996 | Iwatani et al. ................ | 322/28 |
| 5,712,786 A * | 1/1998 | Ueda .............................. | 701/110 |
| 6,275,012 B1 * | 8/2001 | Jabaji ............................ | 322/22 |
| 7,397,157 B2 * | 7/2008 | Maekawa et al. ............ | 310/114 |
| 2006/0097670 A1 * | 5/2006 | Fukasaku et al. ............ | 318/105 |

FOREIGN PATENT DOCUMENTS

| JP | 5-83906 | * | 4/1993 |
|---|---|---|---|
| JP | A 11-98789 | | 4/1999 |

OTHER PUBLICATIONS

Machine Translation, JPO website, JP11-98789, Taniguchi, Apr. 1999.*

* cited by examiner

*Primary Examiner*—Burton Mullins
(74) *Attorney, Agent, or Firm*—Oliff & Berridge, PLC

(57) ABSTRACT

According to the invention, a tandem alternator includes a rotary shaft, a first and a second power generation unit that are arranged in tandem in the axial direction of the rotary shaft, a housing, a slip ring-brush mechanism provided around a rear end portion of the rotary shaft, and a first and a second rectifier that are respectively fixed to a front and a rear end face of the housing, and a controller. The controller is electrically connected between the first rectifier and the slip ring-brush mechanism to control, at least, supply of the first field current to the first field winding. The controller is configured to form a freewheeling circuit when the first field current is interrupted. The controller is fixed to the rear end face of the housing to minimize the distance from the controller to the slip ring-brush mechanism, thereby minimizing resistance loss of the freewheeling circuit.

10 Claims, 6 Drawing Sheets

FRONT SIDE ← → REAR SIDE

AUTOMOTIVE TANDEM ALTERNATOR HAVING HIGH EFFICIENCY AND IMPROVED ARRANGEMENT OF REGULATOR

CROSS-REFERENCE TO RELATED APPLICATION

This application is based on and claims priority from Japanese Patent Application No. 2006-118099, filed on Apr. 21, 2006, the content of which is hereby incorporated by reference into this application.

BACKGROUND OF THE INVENTION

1 Technical Field of the Invention

The present invention relates generally to electric generators. More particularly, the invention relates to a tandem alternator for a vehicle, which has a high efficiency and includes a voltage regulator that is optimally arranged in the alternator.

2 Description of the Related Art

Japanese Patent First Publication No. H11-98789 discloses a tandem alternator for a vehicle, which includes a single rotary shaft and a front-side and a rear-side power generation unit that are arranged in tandem in the axial direction of the rotary shaft.

The tandem alternator further includes a first and a second rectifier that respectively rectify AC powers output from the front-side and rear-side power generation units into DC outputs. The first and second rectifiers each generate a large amount of heat during operation of the alternator. To effectively dissipate the heat and minimize the distances from the rectifiers to the corresponding power generation units, the first and second rectifiers are respectively arranged at a front and a rear portion of the alternator.

Furthermore, in the tandem alternator, the rear-side power generation unit includes a typical lundell-type field. This field is supplied with field current through a slip ring-brush mechanism that is provided around a rear end portion of the rotary shaft. On the other hand, in order to reduce the axial length of the alternator, the front-side power generation unit employs a lundell-type field that includes a stationary field winding, thereby being able to receive field current without a slip ring-brush mechanism.

However, the use of such a lundell-type field with a stationary field winding requires a greater field current and thus decreases the efficiency of the tandem alternator. Accordingly, it is desirable for the front-side power generation unit to employ a typical lundell-type field as well.

Further, to reduce the axial length of the alternator, it is desirable for the fields of the front-side and rear-side power generation units to be supplied with a field current through a common slip ring-brush mechanism that is provided around the rear end portion of the rotary shaft. More specifically, the slip ring-brush mechanism may include three pairs of slip rings and brushes. The first pair may be electrically connected to the field of the front-side power generation unit; the second pair may be electrically connected to the field of the rear-side power generation unit; the third pair may be grounded and commonly used by the front-side and rear-side power generation units.

Furthermore, to meet different voltage requirements of electrical loads provided on the vehicle, it is preferable that the rear-side power generation unit produces a typical voltage of 12V while the front-side one produces a higher voltage of 42 V. In other words, the output voltage of the front-side power generation unit is preferably higher than that of the rear-side one. This is because the rear-side power generation unit is closer to the vehicle engine and thus subject to a higher ambient temperature than the front-side power generation unit.

Moreover, it is desirable for the tandem alternator to include a single voltage regulator (i.e., controller) that regulates both the output voltages of the front-side and rear-side power generation units. Further, in terms of efficiency, it is preferable for the voltage regulator to receive field current from the first rectifier, rather than the second rectifier, and provide the received field current to the fields of the front-side and rear-side power generation units.

However, when the voltage regulator is electrically connected between the first rectifier and the slip ring-brush mechanism and located in close vicinity to the first rectifier, the distance between the voltage regulator and the slip ring-brush mechanism is accordingly long.

Consequently, as to be described in detail later, the resistance loss of wires that electrically connect the voltage regulator to the slip-brush mechanism will increase, thus decreasing the efficiency of the tandem alternator.

In addition, one may consider decreasing the resistance loss of the wires by increasing the thickness thereof. However, the use of thicker wires will increase both the weight and cost of the alternator and make it difficult to suitably arrange those wires in the alternator.

SUMMARY OF THE INVENTION

The present invention has been made in view of the above-mentioned problems.

It is, therefore, a primary object of the present invention to provide a tandem alternator which has a high efficiency and includes a voltage regulator (or controller) that is optimally arranged in the alternator.

According to the present invention, there is provided a tandem alternator which includes a rotary shaft, a first and a second field, a first and a second armature, a housing, a slip ring-brush mechanism, a first and a second rectifier, and a controller.

The first and second fields are arranged in tandem on the rotary shaft. The first field includes a first lundell-type field core fitted on the rotary shaft and a first field winding wound around the first field core. The second field includes a second lundell-type field core fitted on the rotary shaft and a second field winding wound around the second field core.

The first and second armatures are arranged in tandem in an axial direction of the rotary shaft. The first armature is provided on an outer periphery of the first field to constitute, together with the first field, a first electric power generation unit. The second armature is provided on an outer periphery of the second field to constitute, together with the second field, a second electric power generation unit.

The housing rotatably supports the rotary shaft and accommodates therein both the first and second electric power generation units. The housing has a first and a second end face that are apart from each other in an axial direction of the rotary shaft with the first and second electric power generation units intervening therebetween. The first end face is closer to the first electric power generation unit than the second electric power generation unit. The second end face is closer to the second electric power generation unit than the first electric power generation unit.

The slip ring-brush mechanism is provided around an end portion of the rotary shaft, which is closer to the second end face than the first end face of the housing, to pass a first and a second field current respectively to the first and second field windings.

The first and second rectifiers are respectively fixed to the first and second end faces of the housing and work to respectively rectify AC powers output from the first and second armatures into DC powers.

The controller is electrically connected between the first rectifier and the slip ring-brush mechanism to control, at least, supply of the first field current to the first field winding. The controller controls the supply of the first field current to have an ON mode, in which the first field current flows from the first rectifier to the first field winding via the controller and the slip ring-brush mechanism, and an OFF mode in which the first field current is interrupted. The controller is configured to form, when the supply of the first field current is in the OFF mode, a freewheeling circuit to discharge energy stored in the first field winding. The controller is fixed to the second end face of the housing.

With the above configuration, since the first and second field windings are respectively wound around the first and second lundell-type field cores (i.e., both the first and second fields are of typical lundell-type), both the first and second field currents will be small. Further, since the controller is fixed to the second end face of the housing, the distance from the controller to the slip ring-brush mechanism is short, and thus the resistance loss of the freewheeling circuit will be small. Consequently, a high efficiency of the tandem alternator is secured.

According to a further implementation of the invention, the controller includes a switch and a freewheeling diode. The switch is electrically connected in series with the first field winding, and is configured to be selectively turned on and off, thereby intermittently supplying the first field current to the first field winding. The freewheeling diode is electrically connected in parallel with the first winding to form the freewheeling circuit.

The controller also controls supply of the second field current from the first rectifier to the second field winding.

The voltage of the DC power output from the first rectifier is higher than that of the DC power output from the second rectifier.

The tandem alternator further includes an electric wire that electrically connects the first rectifier to the controller. The electric wire is arranged outside both the first and second armatures in the radial direction of the rotary shaft.

The housing has a side wall which surrounds both the first and second electric power generation units and has formed therein a first through-hole that extends in the axial direction of the rotary shaft. The electric wire connecting the first rectifier to the controller is received in the first through-hole of the housing.

The housing consists of a pair of first and second cup-shaped pieces which cover each other in the axial direction of the rotary shaft. The first piece has an end face which represents the first end face of the housing; the second piece has an end face which represents the second end face of the housing. In each of the first and second pieces, the first through-hole of the housing is so formed as to taper in a direction from an interface of the first and second pieces to the end face of that piece.

The tandem alternator further includes an annular spacer that is interposed between the first and second armatures in the axial direction of the rotary shaft. One of the first and second pieces of the housing surrounds a whole of a corresponding one of the first and second armatures and part of the other. The first and second pieces of the housing are connected to each other by means of a plurality of connecting members, thereby securing the first and second armatures and the spacer therebetween.

Each of the first and second pieces of the housing has formed therein a plurality of second through-holes extending in the axial direction of the rotary shaft, and each of the connecting members is made up of a bolt which extends through a pair of the second through-holes that are respectively formed in the first and second pieces of the housing and aligned with each other in the axial direction of the rotary shaft.

The first through-hole of the housing, in which the electric wire is received, is arranged close to a pair of the second through-holes that are respectively formed in the first and second pieces of the housing and aligned with each other in the axial direction of the rotary shaft.

The rotary shaft is configured to be driven by an engine of an automobile.

BRIEF DESCRIPTION OF THE DRAWINGS

The present invention will be understood more fully from the detailed description given hereinafter and from the accompanying drawings of the preferred embodiment of the invention, which, however, should not be taken to limit the invention to the specific embodiment but are for the purpose of explanation and understanding only.

In the accompanying drawings.

DESCRIPTION OF THE PREFERRED EMBODIMENT

Figure 1:
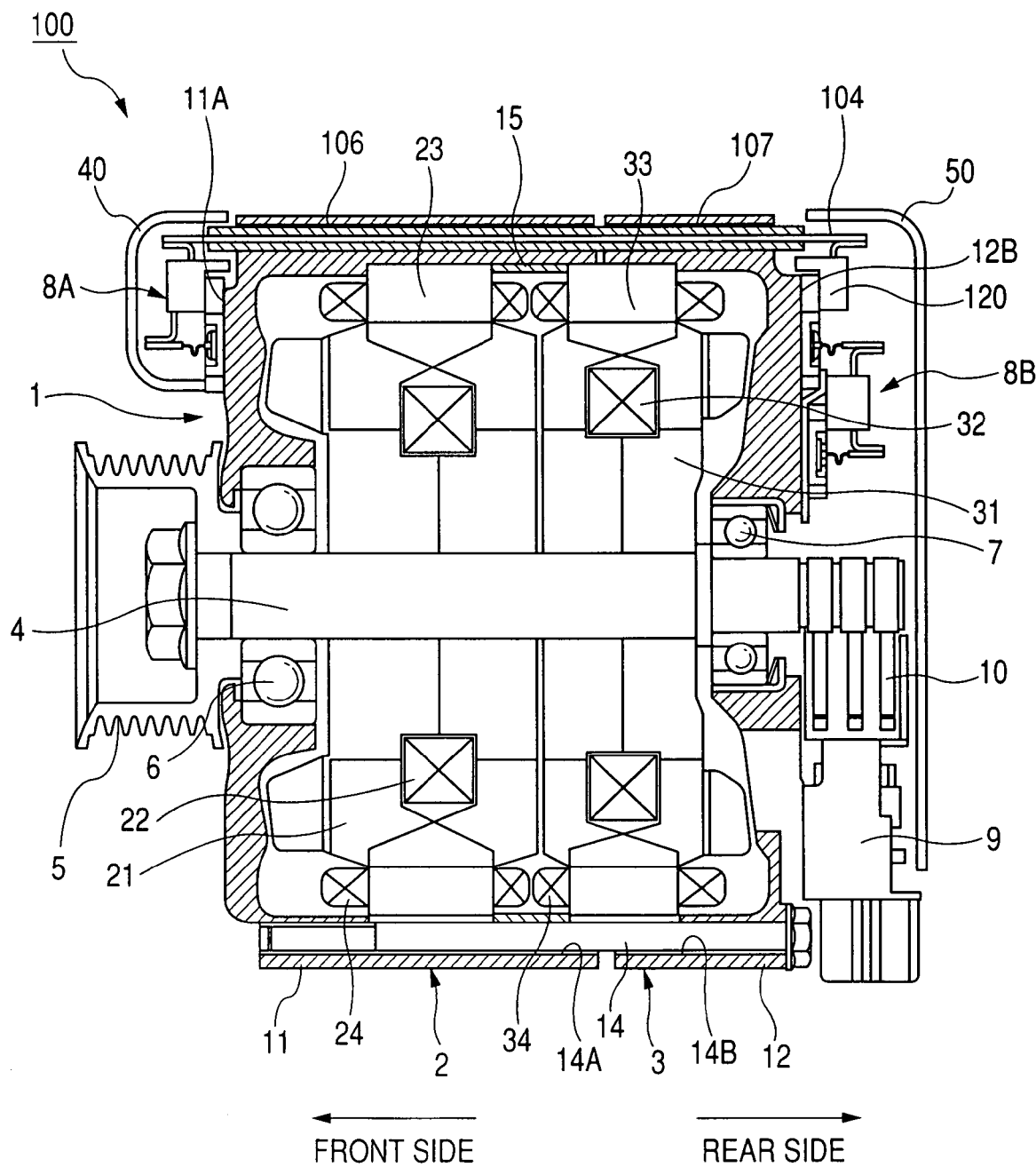
FIG. 1 is a partially cross-sectional side view showing the overall configuration of a tandem alternator according to an embodiment of the invention.

The preferred embodiment of the present invention will be described hereinafter with reference to FIGS. 1-6.

It should be noted that, for the sake of clarity and understanding, identical components having identical functions have been marked, where possible, with the same reference numerals in each of the figures.

Figure 2:
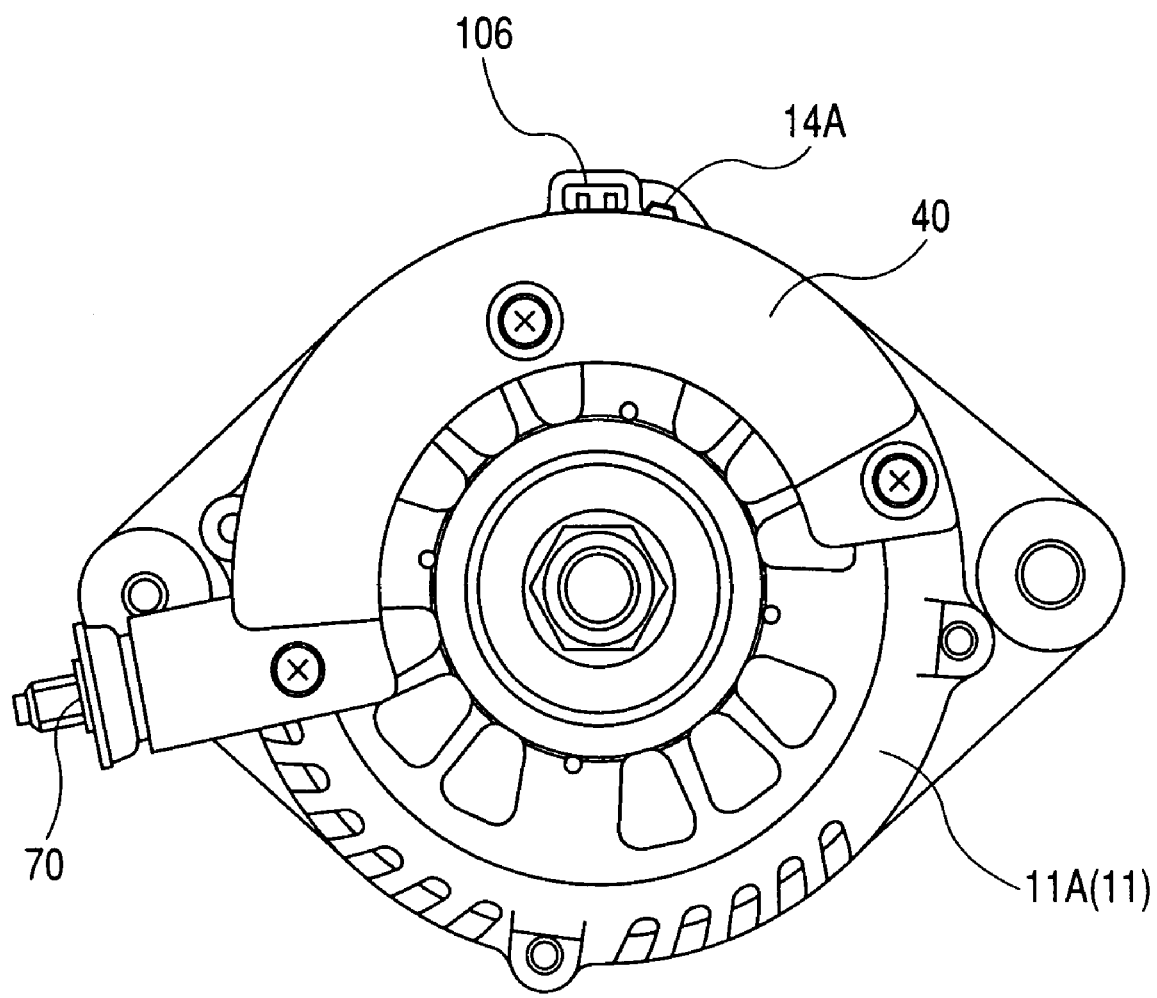
FIG. 2 is a front end elevation of the tandem alternator.
Figure 3:
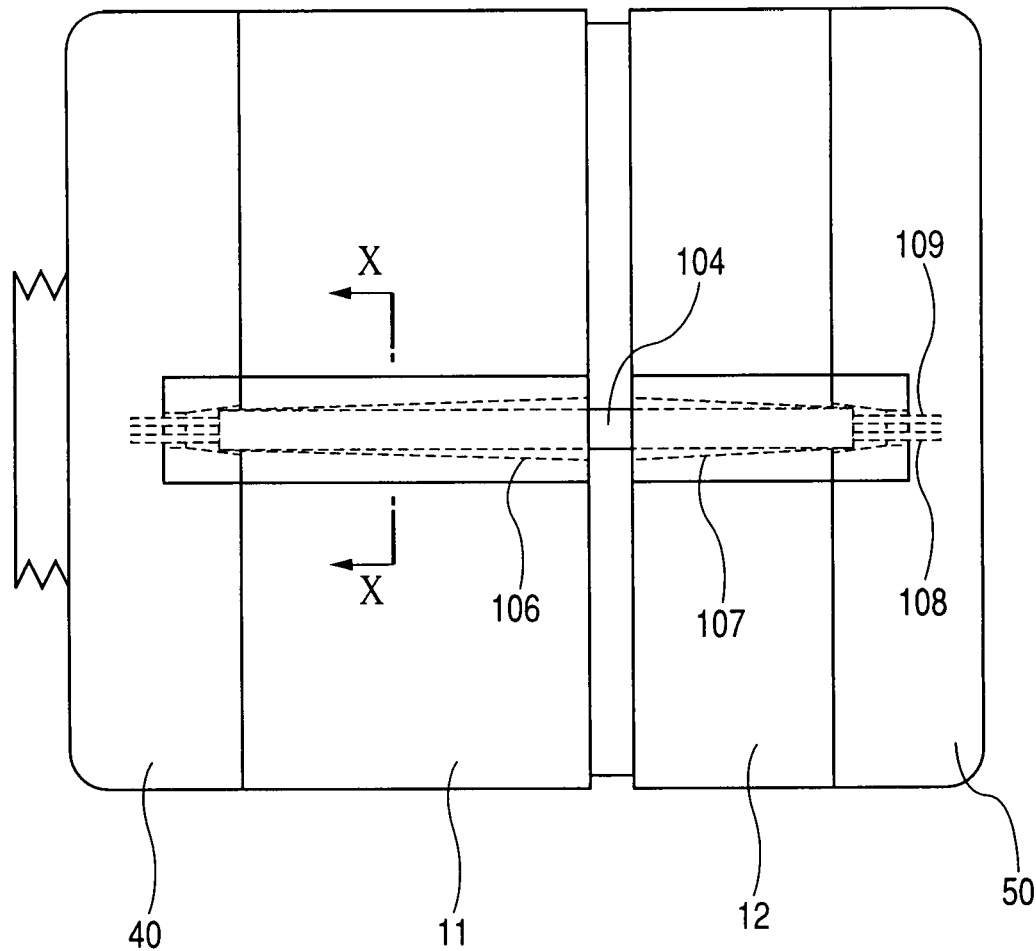
FIG. 3 is a top plan view of the tandem alternator.

FIGS. 1-3 together show the overall configuration of a tandem alternator 100 according to an embodiment of the invention.

As shown in those figures, the tandem alternator 100 includes a housing 1, a first power generation unit 2, a second power generation unit 3, a rotary shaft 4, a pulley 5, a pair of bearings 6 and 7, a first rectifier 8A, a second rectifier 8B, a voltage regulator 9, a slip ring-brush mechanism 10, a rectifier cover 40, and a rear cover 50.

In the present embodiment, the alternator 100 is designed for use in an automobile. More specifically, the alternator 100 is configured to be driven by an engine (not shown) of the automobile via the pulley 5 that is fitted on the rotary shaft 4.

The housing 1 consists of a front housing 11 and a rear housing 12, both of which are cup-shaped and made of a nonmagnetic material. The front and rear housings 11 and 12 are arranged to cover each other in the axial direction of the rotary shaft 4 and connected to each other by a plurality of bolts 14.

More specifically, the front housing 11 has formed therein a plurality of through-holes 14A extending in the axial direction of the rotary shaft 4. Similarly, the rear housing 12 has formed therein a plurality of through-holes 14B extending in the axial direction of the rotary shaft 4. Each of the bolts 14 extends through a pair of through-holes 14A and 14B that are respectively formed in the front and rear housings 11 and 12 and aligned each other in the axial direction of the rotary shaft 4.

Further, in the housing 1, there is provided the pair of bearings 6 and 7, through which the rotary shaft 4 is rotatably supported by the housing 1. In addition, the pulley 5 is mounted on a front end portion of the rotary shaft 4.

The first power generation unit 2 includes a first field provided on the rotary shaft 4 and a first armature surrounding the first field. The first field includes a first lundell-type field core 21 fitted on the rotary shaft 4 and a first field winding 22 wound around the first field core 21. The first armature includes a first hollow cylindrical armature core 23 and a first armature winding 24 wound around the first armature core 23.

The second power generation unit 3 includes a second field, which is arranged on the rotary shaft 4 in tandem with the first field, and a second armature that is arranged in tandem with the first armature in the axial direction of the rotary shaft 4 and surrounds the second field. The second field includes a second lundell-type field core 31 fitted on the rotary shaft 4 and a second field winding 32 wound around the second field core 31. The second armature includes a second hollow cylindrical armature core 33 and a second armature winding 34 wound around the second armature core 33.

Further, between the first and second armature cores 23 and 33, there is provided an annular spacer 15 to keep a predetermined distance in the axial direction of the rotary shaft 4 therebetween.

The first rectifier 8A is fixed to a front end face 11A of the front housing 11 and works to rectify an AC power output from the first armature winding 24 of the first power generation unit 2 into a DC power. On the other hand, the second rectifier 8B is fixed to a rear end face 12B of the rear housing 12 and works to rectify an AC power output from the second armature winding 34 of the second power generation unit 3 into a DC power. In the present embodiment, each of the first and second rectifiers 8A and 8B includes a three-phase full-wave rectification circuit (not shown) that consists of three positive diodes and three negative diodes.

The voltage regulator 9 is fixed to the rear end face 12B of the rear housing 12 and works to regulate both voltages of the DC powers output from the first and second rectifiers 8A and 8B. More specifically, the voltage regulator 9 includes a first and a second controlling circuit which are configured to control supply of a first field current to the first field winding 22 and supply of a second field current to the second field winding 32, respectively, thereby regulating the voltages of the DC powers output from the first and second rectifiers 8A and 8B.

Further, in the present embodiment, the first power generation unit 2 outputs, through the first rectifier 8A and under control of the first controlling circuit of the voltage regulator 9, the DC power at 42V. On the other hand, the second power generation unit 3 outputs, through the second rectifier 8B and under control of the second controlling circuit of the voltage regulator 9, the DC power at 12V.

The slip ring-brush mechanism 10 is provided around a rear end portion of the rotary shaft 4 and includes three pairs of slip ring and brush. The first pair is electrically connected between the first controlling circuit of the voltage regulator 9 and the first field winding 22 to pass the first field current from the first controlling circuit to the first field winding 22. The second pair is electrically connected between the second controlling circuit of the voltage regulator 9 and the second field winding 32 to pass the second field current from the second controlling circuit to the second field winding 32. The third pair is grounded and connected to both ground terminals of the first and second controlling circuits of the voltage regulator 9.

The rectifier cover 40 is, as shown in FIG. 2, shaped in a horseshoe and fixed to the front end face 11A of the front housing 11 to cover the first rectifier 8A from the front side. In addition, there is also shown an output terminal 70 of the first rectifier 8A in FIG. 2.

The rear cover 50 is fixed to the rear end face 12B of the rear housing 12 to cover the second rectifier 8B, the voltage regulator 9, and the slip ring-brush mechanism 10 from the rear side.

In the present embodiment, the voltage regulator 9 is electrically connected between the first rectifier 8A and the slip ring-brush mechanism 10. In other words, both the first and second field currents are taken from the DC power of 42V output from the first rectifier 8A. More specifically, the first field current is supplied from the first rectifier 8A to the first field winding 22 via the first controlling circuit of the voltage regulator 9 and the slip ring-brush mechanism 10; the second field current is supplied from the first rectifier 8A to the second field winding 32 via the second controlling circuit of the voltage regulator 9 and the slip ring-brush mechanism 10.

The electrical connection between the first rectifier 8A and the voltage regulator 9 is made by using a cable 104 as shown in FIGS. 1 and 3. The ends of the cable 104 are respectively joined to terminals of the first rectifier 8A and the voltage regulator 9 by using any method well known in the art, such as soldering, welding, and crimping.

In the present embodiment, the cable 104 is received in both a through-hole 106 of the front housing 11 and a through-hole 107 of the rear housing 12. More specifically, the through-holes 106 and 107 are respectively formed in side walls of the front and rear housings 11 and 12 to extend in the axial direction of the rotary shaft 11. Thus, the cable 104 received in the through-holes 106 and 107 are accordingly positioned on the outside of the first and second armature cores 23 and 33 in the radial direction of the rotary shaft 4.

Further, in the present embodiment, the through-hole 106 is formed in the front housing 11 in close vicinity to one of the through-holes 14A receiving the bolts 14, as shown in FIG. 2. Similarly, the through-hole 107 is formed in the rear housing 12 in close vicinity to one of the through-holes 14B receiving the bolts 14.

Furthermore, in the present embodiment, the through-hole 106 is so formed in the front housing 11 as to taper forward, as shown in FIG. 3. On the other hand, the through-hole 107 is so formed in the rear housing 12 as to taper backward.

Figure 4:
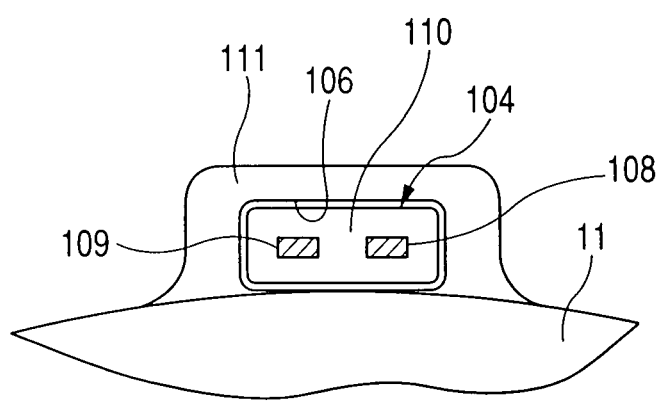
FIG. 4 is a partially cross-sectional view taken along the line X-X in FIG. 3.

Referring now to FIG. 4, the cable 104 includes two wires 108 and 109, which extend in parallel with each other in the longitudinal direction of the cable 104 with a predetermined distance therebetween, and a resin-molded insulator 110 that surrounds and insulates the wires 108 and 109 from one another. In addition, the through-hole 106 receiving the cable 104 is formed in a protruding portion 111 of the front housing 11. The through-hole 107 is formed in the rear housing 12 in the same manner as the through-hole 106; thus, a further description thereof is omitted here.

After having described the overall configuration of the tandem alternator 100 according to the present embodiment, the advantages thereof will be described hereinafter.

As described previously, in the alternator 100, both the fields of the first and second power generation units 2 and 3 are of typical lundell-type.

Accordingly, compared to the above-described conventional tandem alternator, in which one of the fields is of a lundell-type with a stationary field winding, the efficiency of the alternator 100 is remarkably increased.

Further, in the alternator 100, the voltage regulator 9 is electrically connected between the first rectifier 8A and the slip ring-brush mechanism 10.

With this electrical connection, it is possible to supply both the first and second field currents at the higher voltage of 42V, thereby reducing energy loss that occurs during excitation of the first and second fields.

Furthermore, in the alternator 100, the voltage regulator 9 is fixed to the rear end face 12B of the rear housing 12.

Figure 5:
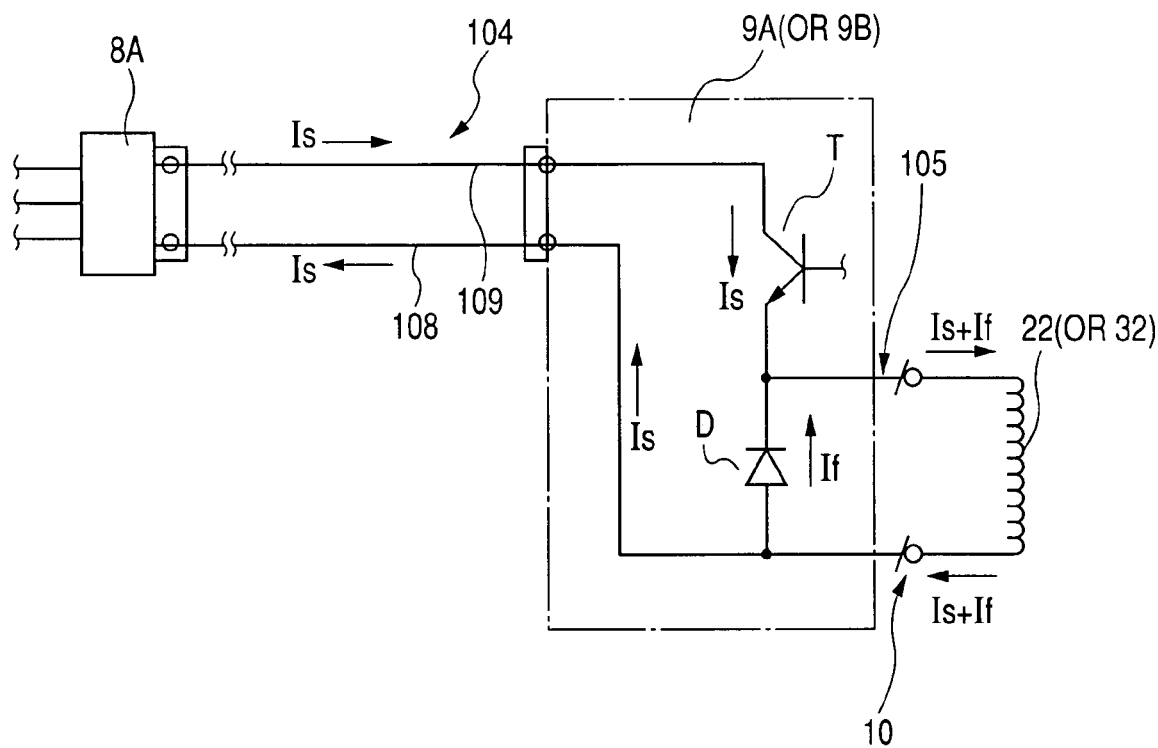
FIG. 5 is a circuit diagram showing the arrangement of a voltage regulator in the tandem alternator according to the embodiment of the invention.

FIG. 5 shows the electrical connection of the first controlling circuit 9A (may alternatively be the second controlling circuit 9B) of the voltage regulator 9 with the first rectifier 8A and the first field winding 22 (may alternatively be the second field winding 32) in the alternator 100.

As shown in FIG. 5, in the present embodiment, the first controlling circuit 9A is configured to include a power transistor T and a freewheeling diode D. The power transistor T is electrically connected in series with the first field winding 22, and is configured to be selectively turned on and off, thereby intermittently supplying the first field current to the first field winding 22. The freewheeling diode D is electrically connected in parallel with the first field winding 22, thereby forming a freewheeling circuit.

With the above configuration, when the power transistor T is turned on, the first field current Is flows from the first rectifier 8A to the first field winding 22 via the power transistor T and the slip ring-brush mechanism 10. Thus, both the cable 104 and a cable 105 that electrically connects the voltage regulator 9 to the slip ring-brush mechanism 10 conduct the first field current Is.

On the contrary, when the power transistor T is turned off, the electric energy stored in the first field winding 22 is discharged through the freewheeling diode D. Thus, a freewheeling current If flows through the cable 105 while no current flows through the cable 104.

In the present embodiment, since the voltage regulator 9 is fixed to the rear end face 12B of the rear housing 12, the distance between the voltage regulator 9 and the slip ring-brush mechanism 10 is short. In other words, the cable 105 is short, and thus the length of flow path of the freewheeling current If is small. Consequently, the resistance loss of the freewheeling circuit will accordingly be small.

Figure 6:
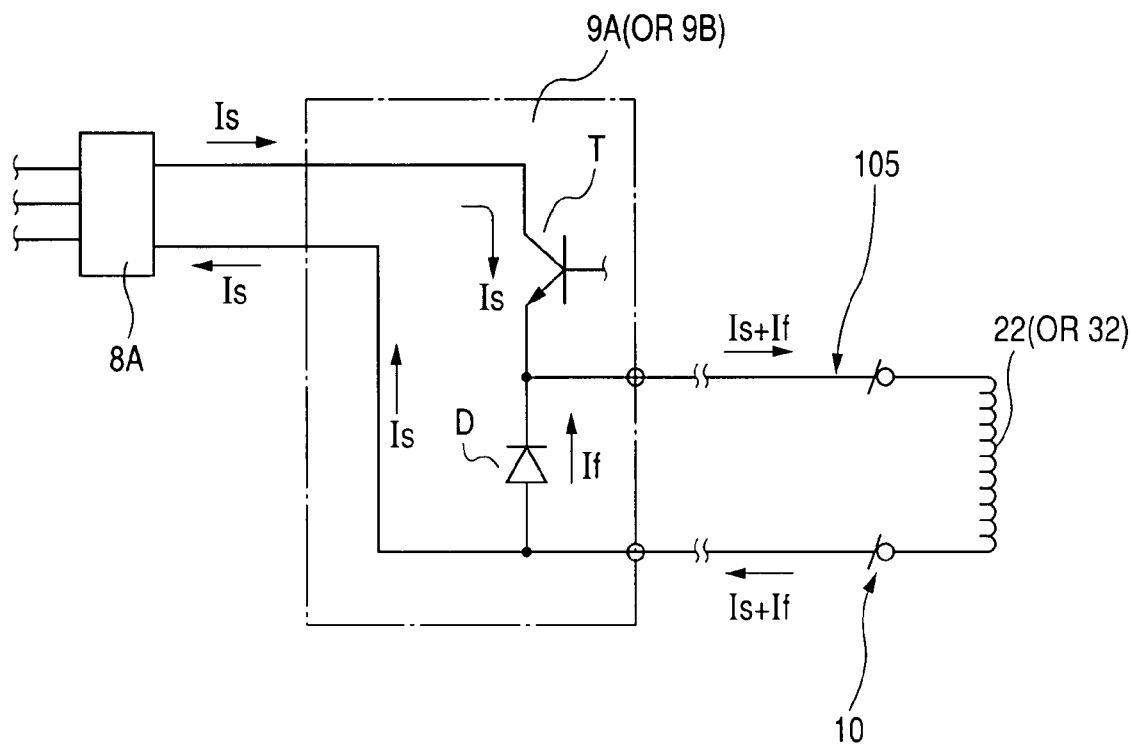
FIG. 6 is a circuit diagram showing an undesirable comparative example of the arrangement of the voltage regulator.

FIG. 6 shows an undesirable comparative example where the voltage regulator 9 is fixed to the front end face 11A of the front housing 11.

As shown in FIG. 6, in this case, the distance between the voltage regulator 9 and the slip ring-brush mechanism 10 is long. In other words, the cable 105 is long. Thus, the length of flow path of the freewheeling current If is increased, while that of the first field current Is is kept constant. Consequently, the resistance loss of the freewheeling circuit will increase, and thus the efficiency of the alternator will decrease.

Accordingly, with the arrangement of the voltage regulator 9 according to the present embodiment, a high efficiency of the alternator 100 is further reliably secured.

In addition, as seen from FIGS. 1 and 2, the front end face 11A of the front housing 11 is in close vicinity to the pulley 5, and thus the area thereon which is uncovered by the rectifier cover 40 and the pulley 5 is limited. Accordingly, without arranging the voltage regulator 9 on the front end face 11A, it is possible to arrange more cooling air intakes on the front end face 11A.

Further, in the alternator 100, the voltage regulator 9 works to regulate both the voltages of DC powers output from the first and second rectifiers 8A and 8B.

Accordingly, with the use of the single voltage regulator 9, it is possible to make the alternator 100 compact.

In the alternator 100, the first power generation unit 2 produces the higher voltage of 42V, while the second power generation unit 3 produces the typical voltage of 12V.

As described previously, the second power generation unit 3 is closer to the vehicle engine and thus subject to a higher ambient temperature than the first power generation unit 2. Accordingly, through arranging the second power generation unit 3 to produce a smaller power at the lower voltage, it is possible to prevent the alternator 100 from becoming too hot during operation.

In the alternator 100, the cable 104 that electrically connects the first rectifier 8A to the voltage regulator 9 is arranged outside both the first and second armatures in the radial direction of the rotary shaft 4.

Accordingly, compared to the case of arranging the cable 104 to pass through the insides of the first and second armature cores 23 and 33, it is possible to secure higher power outputs of the first and second power generation units 2 and 3. Also, it is possible to considerably reduce the inductances of the wires 108 and 109 included in the cable 104, thereby reliably preventing a high switching surge voltage from occurring across those wires.

In the alternator 100, the cable 104 is received in the through-holes 106 and 107 that are respectively formed in the side walls of the front and rear housings 11 and 12 to extend in the axial direction of the rotary shaft 4.

Accordingly, it is possible to reliably protect the cable 104 from mechanical damages, thereby preventing any short or open circuit from occurring between the first rectifier 8A and the voltage regulator 9. Moreover, since the cable 104 is surrounded by the nonmagnetic material-made first and second housings 11 and 12, it is possible to reduce the inductances of the wires 108 and 109 though they are located in the vicinities of the first and second armature cores 23 and 33.

In the alternator 100, the through-hole 106 is formed in the front housing 11 to taper forward, while the through-hole 107 is formed in the rear housing 12 to taper backward.

With the above formation, the cable 104 can be easily inserted through both the through-holes 106 and 107 during assembly, even when the through-holes 106 and 107 are slightly deviated from desired positions. Consequently, the productivity can be accordingly improved.

In the alternator 1, there is interposed the annular spacer 15 between the first and second armature cores 23 and 33; the front housing 11 surrounds the entire first power generation unit 2 and part of the second power generation unit 3; the front and rear housings 11 and 12 are tightly connected to each other by means of the bolts 14, thereby securely retaining the first and second armature cores 23 and 33 and the spacer 15 therebetween.

With the above arrangement, a center housing, which is often used in conventional automotive tandem alternators, is omitted from the alternator 100. As a result, the manufacturing cost is reduced and the assembly is simplified.

In the alternator 100, the through-hole 106 is arranged in close vicinity to one of the through-holes 14A receiving the bolts 14, and the through-hole 107 is arranged in close vicinity to one of the through-holes 14B receiving the bolts 14.

With the above arrangement, it is possible to reduce processing strain that occurs in the front and rear housings 11 and 12 during processing, thereby preventing the through-holes 106 and 107 from deviating from the desired positions.

While the above particular embodiment of the invention has been shown and described, it will be understood by those who practice the invention and those skilled in the art that various modifications, changes, and improvements may be made to the invention without departing from the spirit of the disclosed concept.

Figure 7:
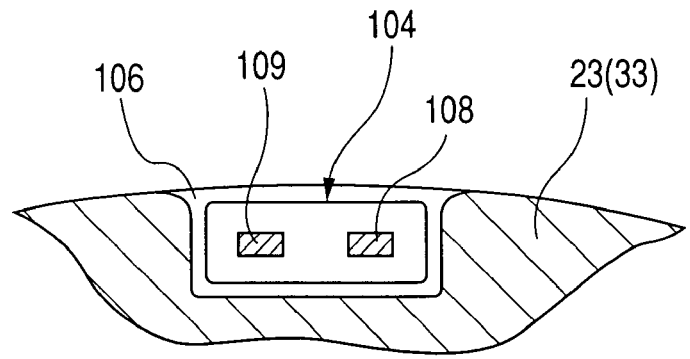
FIG. 7 is a partially cross-sectional view illustrating a variation of a cable-receiving through-hole in the tandem alternator.

For example, though the through-holes 106 and 107 are respectively formed in the side walls of the front and rear housings 11 and 12 in the previous embodiment, they may be provided as recesses respectively formed on the outer surfaces of the first and second armature cores 23 and 33, as shown in FIG. 7.

Figure 8:
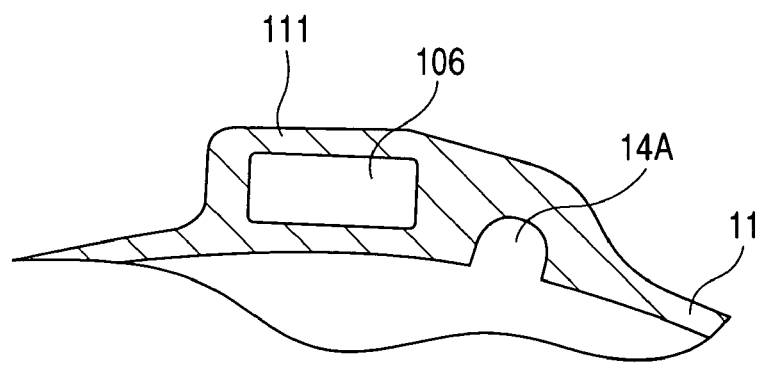
FIG. 8 is a partially cross-sectional view illustrating a variation of a bolt-receiving through-hole in the tandem alternator.
Figure 9:
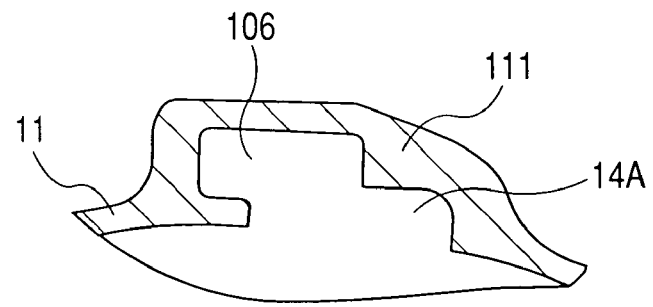
FIG. 9 is a partially cross-sectional view illustrating another variation of the bolt-receiving through-hole.

Moreover, as shown in FIG. 8, one of the through-holes 14A may be so formed in the protruding portion 111 of the front housing 11 as to open on the inner surface of the front housing 11. Further, as shown in FIG. 9, this through-hole 14A may be so formed as to communicate with the through-hole 106, thereby forming an integrated through-hole.

Figure 10:
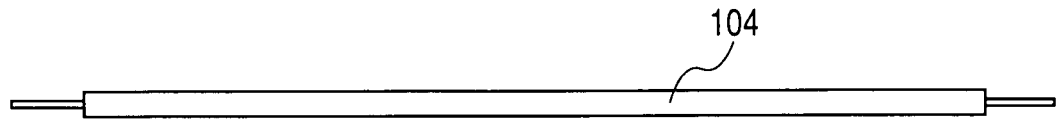
FIG. 10 is a side view showing a cable used in the tandem alternator to connect a first rectifier to the voltage regulator.
Figure 11:
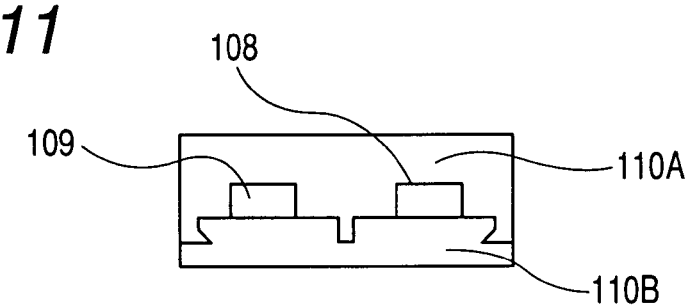
FIG. 11 is a partially cross-sectional view showing a variation of the cable.
Figure 12:
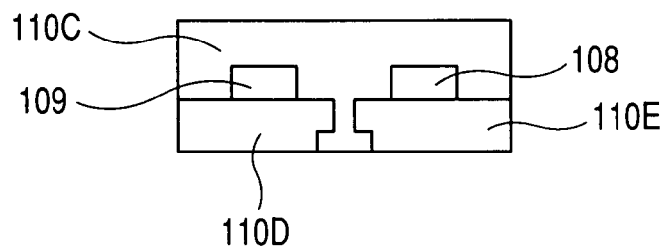
FIG. 12 is a partially cross-sectional view showing another variation of the cable.
Figure 13:
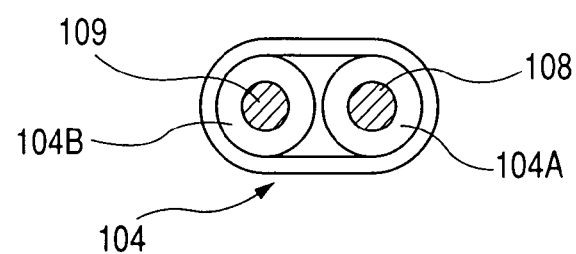
FIG. 13 is a partially cross-sectional view showing yet another variation of the cable.

FIG. 10 is a side view of the cable 104. Though the resin-molded insulator 110 is provided in the form of a single part in the previous embodiment, it may be provided in two-part form, thus including a first part 110A and a second part 110B as shown in FIG. 11. The insulator 110 may also be provided in three-part form, thus including a first part 110C, a second part 110D, and a third part 110E as shown in FIG. 12. Those parts of the insulator 110 may be joined together by any method well known in the art, such as heating and crimping. Further, as shown in FIG. 13, the cable 104 may be configured with two cables 104A and 104B in which the wires 108 and 109 are respectively included.

Furthermore, the cable 104 may be integrally formed with either the front rectifier 8A or a terminal board 120 that is fixed to the rear end face 12B of the rear housing 12 as shown in FIG. 1, thereby improving the efficiency of assembly.

Such modifications, changes, and improvements within the skill of the art are intended to be covered by the appended claims.

What is claimed is:

1. A tandem alternator comprising:
   a rotary shaft;
   a first and a second field which are arranged in tandem on the rotary shaft, the first field including a first lundell-type field core fitted on the rotary shaft and a first field winding wound around the first field core, the second field including a second lundell-type field core fitted on the rotary shaft and a second field winding wound around the second field core;
   a first and a second armature which are arranged in tandem in an axial direction of the rotary shaft, the first armature being provided on an outer periphery of the first field to constitute, together with the first field, a first electric power generation unit, the second armature being provided on an outer periphery of the second field to constitute, together with the second field, a second electric power generation unit;
   a housing rotatably supporting the rotary shaft and accommodating therein both the first and second electric power generation units, the housing having a first and a second end face that are apart from each other in an axial direction of the rotary shaft with the first and second electric power generation units intervening therebetween, the first end face being closer to the first electric power generation unit than the second electric power generation unit, the second end face being closer to the second electric power generation unit than the first electric power generation unit;
   a slip ring-brush mechanism provided around an end portion of the rotary shaft, which is closer to the second end face than the first end face of the housing, to pass a first and a second field current respectively to the first and second field windings;
   a first and a second rectifier which are respectively fixed to the first and second end faces of the housing and work to respectively rectify AC powers output from the first and second armatures into DC powers;
   a controller electrically connected between the first rectifier and the slip ring-brush mechanism to control, at least, supply of the first field current to the first field winding, the controller controlling the supply of the first field current to have an ON mode, in which the first field current flows from the first rectifier to the first field winding via the controller and the slip ring-brush mechanism, and an OFF mode in which the first field current is interrupted, the controller being configured to form, when the supply of the first field current is in the OFF mode, a freewheeling circuit to discharge energy stored in the first field winding, the controller being fixed to the second end face of the housing to minimize a distance from the controller to the slip ring-brush mechanism, thereby minimizing resistance loss of the freewheeling circuit; and
   an electric wire that electrically connects the first rectifier to the controller, wherein the electric wire is arranged outside both the first and second armatures in the radial direction of the rotary shaft.

2. The tandem alternator as set forth in claim 1, wherein the controller includes:
   a switch which is electrically connected in series with the first field winding and configured to be selectively turned on and off, thereby intermittently supplying the first field current to the first field winding; and
   a freewheeling diode which is electrically connected in parallel with the first winding to form the freewheeling circuit.

3. The tandem alternator as set forth in claim 1, wherein the controller also controls supply of the second field current from the first rectifier to the second field winding.

4. The tandem alternator as set forth in claim 1, wherein voltage of the DC power output from the first rectifier is higher than that of the DC power output from the second rectifier.

5. The tandem alternator as set forth in claim 1, wherein the housing has a side wall which surrounds both the first and second electric power generation units and has formed therein a first through-hole that extends in the axial direction of the rotary shaft, and wherein the electric wire connecting the first rectifier to the controller is received in the first through-hole of the housing.

6. The tandem alternator as set forth in claim 5, wherein the housing consists of a pair of first and second cup-shaped pieces which cover each other in the axial direction of the rotary shaft, the first piece having an end face which represents the first end face of the housing, the second piece having an end face which represents the second end face of the housing, and wherein in each of the first and second pieces, the first through-hole of the housing is so formed as to taper in a direction from an interface of the first and second pieces to the end face of the each of the first and second pieces.

7. The tandem alternator as set forth in claim 6, further comprising an annular spacer that is interposed between the first and second armatures in the axial direction of the rotary shaft, wherein one of the first and second pieces of the housing surrounds a whole of a corresponding one of the first and second armatures and part of the other, and wherein the first and second pieces of the housing are connected to each other by means of a plurality of connecting members, thereby securing the first and second armatures and the spacer therebetween.

8. The tandem alternator as set forth in claim 7, wherein each of the first and second pieces of the housing has formed therein a plurality of second through-holes extending in the axial direction of the rotary shaft, and each of the connecting members is made up of a bolt which extends through a pair of the second through-holes that are respectively formed in the first and second pieces of the housing and aligned with each other in the axial direction of the rotary shaft.

9. The tandem alternator as set forth in claim 8, wherein the first through-hole of the housing, in which the electric wire is received, is arranged close to a pair of the second through-holes that are respectively formed in the first and second pieces of the housing and aligned with each other in the axial direction of the rotary shaft.

10. The tandem alternator as set forth in claim 1, wherein the rotary shaft is configured to be driven by an engine of an automobile.

* * * * *